United States Patent
Hayashi

(10) Patent No.: US 12,488,689 B2
(45) Date of Patent: Dec. 2, 2025

(54) INFORMATION PROCESSING APPARATUS AND VEHICLE

(71) Applicant: TOYOTA JIDOSHA KABUSHIKI KAISHA, Aichi-ken (JP)

(72) Inventor: Masatoshi Hayashi, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 52 days.

(21) Appl. No.: 18/504,161

(22) Filed: Nov. 8, 2023

(65) Prior Publication Data

US 2024/0161624 A1 May 16, 2024

(30) Foreign Application Priority Data

Nov. 11, 2022 (JP) ................................. 2022-181393

(51) Int. Cl.
*G08G 1/16* (2006.01)
*B60W 30/09* (2012.01)

(52) U.S. Cl.
CPC ............. *G08G 1/166* (2013.01); *B60W 30/09* (2013.01); *B60W 2420/403* (2013.01); *B60W 2554/80* (2020.02)

(58) Field of Classification Search
CPC ...... G08G 1/166; G08G 1/09; G08G 1/09623; G08G 1/16; G08G 1/164; G08G 1/0112; G08G 1/0125; G08G 1/0962; G08G 1/096791; B60W 30/09; B60W 2420/403; B60W 2554/80
See application file for complete search history.

(56) References Cited

U.S. PATENT DOCUMENTS

| 2010/0033571 A1* | 2/2010 | Fujita | G06V 20/584 348/149 |
| 2019/0143968 A1* | 5/2019 | Song | B60W 10/18 |
| 2020/0026284 A1 | 1/2020 | Hiramatsu et al. | |
| 2021/0188261 A1* | 6/2021 | Song | B60W 40/105 |

FOREIGN PATENT DOCUMENTS

| JP | 2006-224754 A | 8/2006 | |
| JP | 2010-225075 A | 10/2010 | |
| JP | 2010-282421 A | 12/2010 | |
| WO | WO-2017096420 A1 * | 6/2017 | ............... H01Q 1/04 |
| WO | 2018/055731 A1 | 3/2018 | |
| WO | WO-2018199075 A1 * | 11/2018 | ............ B60W 30/16 |

* cited by examiner

*Primary Examiner* — Joseph J Dallo
(74) *Attorney, Agent, or Firm* — HAUPTMAN HAM, LLP

(57) ABSTRACT

An information processing apparatus acquires a moving image of an intersection that exists in front of a vehicle, which is captured by an on-board camera that captures images in front of the vehicle, at which there are a pedestrian signal for pedestrians crossing a roadway that intersects a roadway on which the vehicle is traveling and a vehicle signal for the vehicle. The information processing apparatus outputs notification information to notify a driver of the vehicle that a signal displayed by the vehicle signal at the intersection is expected to change to a second signal that does not permit the vehicle to proceed, when a signal displayed by the pedestrian signal is detected to have changed from a first signal that permits the pedestrian to proceed, based on the moving image.

15 Claims, 4 Drawing Sheets

INFORMATION PROCESSING APPARATUS AND VEHICLE

CROSS REFERENCE TO THE RELATED APPLICATION

This application claims the benefit of Japanese Patent Application No. 2022-181393, filed on Nov. 11, 2022, which is hereby incorporated by reference herein in its entirety.

BACKGROUND

Technical Field

This disclosure relates to information processing apparatus.

Description of the Related Art

Japanese Patent Application Laid-Open Publication No. 2010-282421 discloses a driving support device. The driving support device disclosed in Japanese Patent Application Laid-Open Publication No. 2010-282421 acquires traffic light information regarding the lighting status of traffic lights. The driver assistance system is capable of performing a first driver assistance based on traffic light information and a second driver assistance based on traffic light information after the first driver assistance is performed. When the driver assistance system does not perform one of the first and second driver assistance, it does not perform the other of the first and second driver assistance.

SUMMARY

The purpose of this disclosure is to improve safety when vehicles travel near intersections.

An information processing apparatus according to a first aspect of the present disclosure comprises a controller at least one processor configured to;
  acquire a moving image of an intersection that exists in front of a vehicle, which is captured by an on-board camera that captures images in front of the vehicle, at which there are a pedestrian signal for pedestrians crossing a roadway that intersects a roadway on which the vehicle is traveling and a vehicle signal for the vehicle, and
  output notification information to notify a driver of the vehicle that a signal displayed by the vehicle signal at the intersection is expected to change to a second signal that does not permit the vehicle to proceed, when a signal displayed by the pedestrian signal is detected to have changed from a first signal that permits the pedestrian to proceed, based on the moving image.

An information processing apparatus according to a second aspect of the present disclosure comprises a controller at least one processor configured to;
  acquire a moving image of an intersection that exists in front of a vehicle, which is captured by an on-board camera that captures images in front of the vehicle, at which there are a pedestrian signal for pedestrians crossing a roadway that intersects a roadway on which the vehicle is traveling and a vehicle signal for the vehicle, and
  execute a predetermined process to decelerate the vehicle when the controller detects, based on the moving image, that a signal displayed by the pedestrian signals has changed from a first signal that permits pedestrians to proceed.

This disclosure improves safety when vehicles travel near intersections.

DESCRIPTION OF THE EMBODIMENTS

Figure 1:
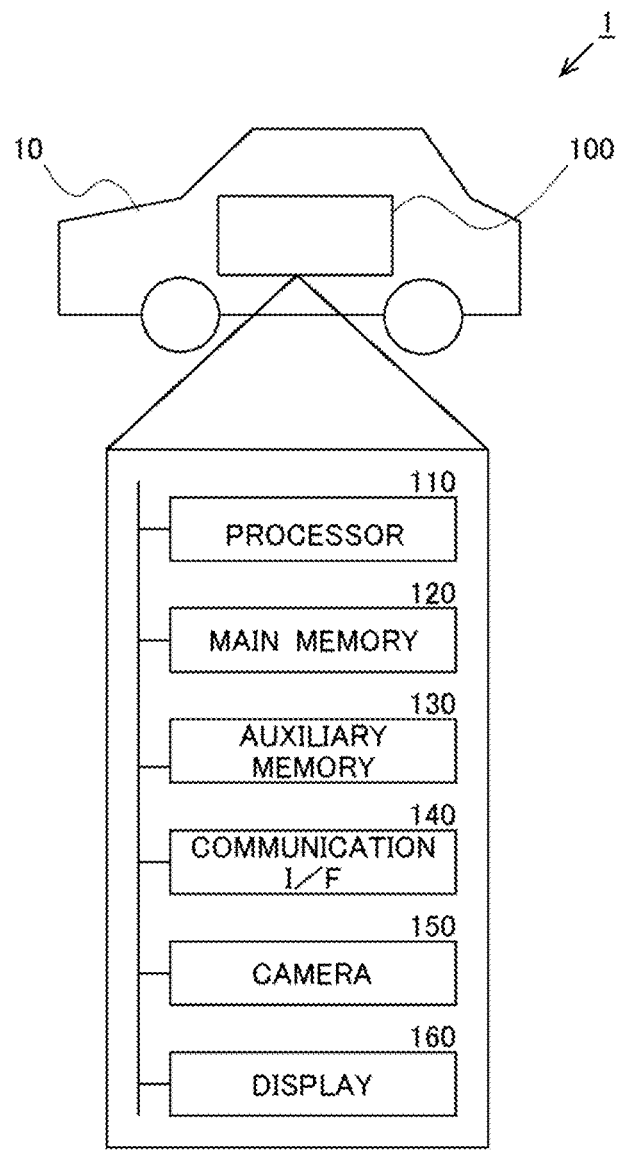
FIG. 1 indicates a schematic diagram of the vehicle system.

Assume a vehicle is turning right or left at an intersection. Here, the intersection is equipped with a pedestrian signal for pedestrians and a vehicle signal for a vehicle. The pedestrian signal is a signal for pedestrians crossing a roadway that intersects a roadway on which the vehicle is traveling. The vehicle turns right or left at the intersection when a signal for vehicles (sometimes referred to as a "vehicle signal") displays a signal allowing the vehicle to proceed. If a pedestrian is crossing the roadway that intersects the roadway on which the vehicle is traveling, the vehicle will wait for the pedestrian to complete the crossing in the middle of a right or left turn.

In this case, a pedestrian signal for a pedestrian (hereinafter sometimes referred to as a "pedestrian signal") crossing a roadway where the vehicle is traveling is displayed as a signal to allow the pedestrian to proceed. Pedestrians will not cross the roadway when the signal displayed by the pedestrian signal changes from a signal that permits pedestrians to proceed (sometimes referred to as the "first signal") to a signal that does not permit pedestrians to proceed. At this point, the signal displayed by the vehicle signal remains the signal allowing the vehicle to proceed. Thus, when the signal displayed by the pedestrian signal changes from the first signal, the signal displayed by the vehicle signal is the signal that permits the vehicle to proceed, the vehicle can turn right or left at the intersection. Then, after the signal displayed by the pedestrian signal changes from a first signal to a signal that does not allow pedestrians to proceed, the signal displayed by the vehicle signal changes from a signal that allows vehicles to proceed to a signal that does not allow them to proceed.

Assume also that the signal displayed by the vehicle signal at the intersection in front of the vehicle changes from a signal that allows the vehicle to proceed. At this time, a driver of the vehicle may be attempting to go straight through the intersection, turn right or turn left. In this case, the driver of the vehicle may not anticipate that the signal displayed by the vehicle signal will change from a signal that permits the vehicle to proceed. This would create a risk of unsafe driving, such as emergency braking by the driver of vehicle when the signal for vehicle is changed by the signal shown indicate.

Therefore, the information processing apparatus for the first aspect of the present disclosure solves such problems by taking advantage of the fact that there is a time between the signal displayed by the pedestrian signal changing from the first signal and the signal displayed by the vehicle signal changing from the signal allowing the vehicle to proceed.

The controller, comprising a controller at least one processor, of the information processing apparatus according to the first aspect of the present disclosure acquires a moving image of an intersection, which is captured by an in-vehicle camera that captures images of the front of a vehicle. At this time, the signal displayed by pedestrian signal is captured in the video image acquired by the controller of the information processing apparatus. Therefore, the controller of the information processing apparatus detects, based on the moving image, that the signal displayed by the pedestrian signal has changed from the first signal.

Here, as described above, after the signal displayed by the pedestrian signal changes from the first signal, the vehicle signal changes from a signal that permits vehicle progress to a signal that does not permit vehicle progress (hereinafter sometimes referred to as the "second signal"). Therefore, the controller of the information processing apparatus can predict that the signal displayed by the pedestrian signal will change to a second signal by detecting that the signal displayed by a vehicle signal has changed from the first signal. Therefore, the controller outputs notification information when it detects that the signal displayed by the pedestrian signal has changed from the first signal. Here, the notification information is information to inform the driver of the vehicle that the signal displayed by the vehicle signal is expected to change to a second signal.

Notification information is output by the information processing apparatus according to the first aspect of the present disclosure when it is detected that the signal displayed by a pedestrian signal has changed from the first signal. This allows the driver of the vehicle to know that the signal displayed by the vehicle signal is expected to change to the second display. This prevents the driver of a vehicle from driving in an unsafe manner, such as braking suddenly, when the signal displayed by the vehicle signal changes. As a result, safety can be improved when vehicles travel near intersections.

a controller comprising a controller at least one processor of the information processing apparatus of the second present disclosure performs a predetermined process to decelerate the vehicle when it detects, based on the moving image, that the indication of the pedestrian signal has changed from the first signal. This allows the vehicle to slow down when the signal displayed by the vehicle signal is expected to change to a second signal. This will prevent the driver of the vehicle from driving unsafely, such as braking suddenly near the intersection, due to changes in the signal displayed by the vehicle signal. This can still improve safety when vehicles travel near intersections.

Specific embodiments of the present disclosure will be described below on the basis of the drawings. The technical scope of the present disclosure is not limited to sizes, materials, shapes, relative arrangement, and the like of constituent components described in the present embodiments unless otherwise described.

EMBODIMENT

Figure 2:
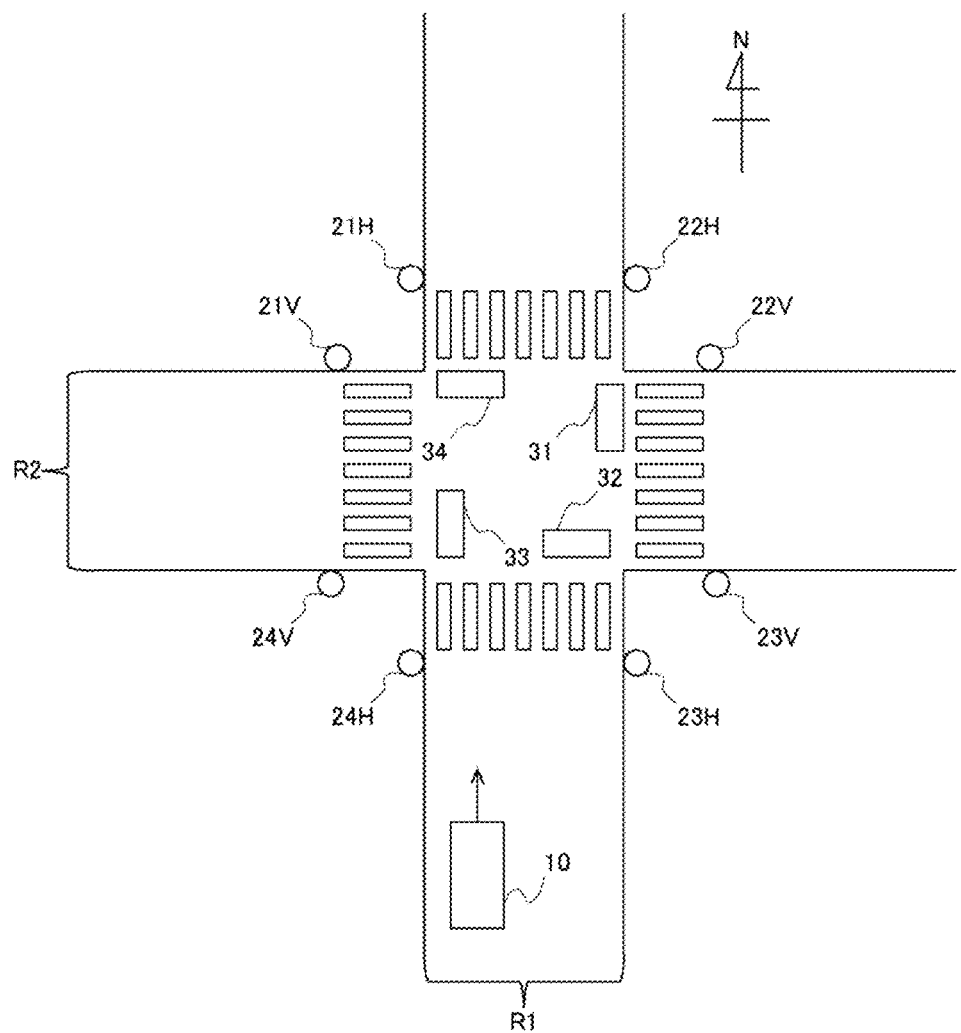
FIG. 2 indicates an example of a vehicle in motion.

The vehicle system 1 in this embodiment is described based on FIGS. 1 and 2. FIG. 1 indicates a schematic diagram of the vehicle system 1. The vehicle system 1 comprises a vehicle 10 and an in-vehicle device 100. In the vehicle system 1, the vehicle 10 and the in-vehicle device 100 are interconnected by an in-vehicle network.

(Vehicle)

The vehicle 10 is a vehicle driven by the driver of vehicle 10. FIG. 2 indicates an example of a vehicle 10 in motion. In the example shown in FIG. 2, vehicle 10 is traveling from south to north. In addition, an intersection exists in front of the vehicle 10 in the direction of travel. The intersection that exists in front of the vehicle 10 in the direction of travel is the intersection of the north-south oriented roadway R1 and the east-west oriented roadway R2.

As indicated in FIG. 2, there are eight pedestrian signals at the intersection: a traffic signal 21V, a traffic signal 21H, a traffic signal 22V, a traffic signal 22H, a traffic signal 23V, a traffic signal 23H, a traffic signal 24V, and a traffic signal 24H. Hereafter, the eight pedestrian signals, the traffic signal 21V, the traffic signal 21H, the traffic signal 22V, the traffic signal 22H, the traffic signal 23V, the traffic signal 23H, the traffic signal 24V, and the traffic signal 24H, may be referred to simply as "pedestrian signals" when they are not distinguished.

The pedestrian signals display signals to control the progress of pedestrians crossing the roadway. The pedestrian signals display signals that allow pedestrians to proceed (sometimes referred to as "permission signals"). Specifically, the pedestrian signals display a green light as an permission signal. The pedestrian signals also display signals that do not allow pedestrians to proceed (sometimes referred to as "non-permission signals"). Specifically, pedestrian signals display a red light as a non-permission signal.

The pedestrian signals may also display a signal indicating that the display is to be changed from a permitted signal to a disallowed signal prior to changing the display from a permitted signal to a disallowed signal. For example, the pedestrian signal may flash a green light to indicate that the display is changing to a red light. Thus, the pedestrian signals vary the permission signal (green signal) by displaying a flashing green signal.

The traffic signals 21V, 22V, 23V, and 24V are signals that display signals to control the progress of pedestrians crossing the roadway R2. The traffic signals 21V and 22V are signals that display signals to control the progress of pedestrians crossing the roadway R2 from south to north. Therefore, the traffic signals 21V and 22V display signals to the south so that the signals displayed by the traffic signals 21V and 22V are visible by pedestrians from the south side of the roadway R2. The traffic signals 23V and 24V are signals that display signals to pedestrians crossing the roadway R2 from north to south to control their progress. Therefore, so that pedestrians can see the signals displayed by the traffic signals 23V and 24V from the north side of the roadway R2, the traffic signals 23V and 24V display signals in the north direction. The traffic signal 21V or the traffic signal 22V in this form corresponds to the "pedestrian signal" for this disclosure.

Traffic signal 21H, 22H, 23H, and 24H are traffic signals (traffic lights) that display signals to control the progress of pedestrians crossing the roadway R1. Traffic signals 21H and 24H are signals that display signals to control the progress of pedestrians crossing the roadway R1 from east to west. Therefore, so that pedestrians can see the signals displayed by the traffic signals 21H and 24H from the east side of the roadway R1, the traffic signals 21H and 24H display signals in the east direction. The traffic signals 22H and 23H are signals that display signals to control the progress of pedestrians crossing the roadway R1 from west to east. Therefore, so that pedestrians can see the signals displayed by the traffic signals 22H and 23H from the west side of the roadway R1, the traffic signals 22H and 23H display signals in the west direction.

As indicated in FIG. 2, there are four vehicle signals at the intersection: a traffic signal 31, a traffic signal 32, a traffic signal 33, and a traffic signal 34. The traffic signal 31 is a traffic signal that displays signals to control the progress of vehicles traveling on roadway R2 and entering the intersection from the west. The traffic signal 32 is a traffic signal that displays signals to control the progress of vehicles traveling on roadway R1 and entering the intersection from the north. The traffic signal 33 is a traffic signal that displays signals to control the progress of vehicles traveling on roadway R2 and entering the intersection from the east. The traffic signal 34 is a traffic signal that displays signals to control the progress of vehicles traveling on roadway R1 and entering the intersection from the south.

Let us assume that vehicle 10 turns left on roadway R1 at an intersection and enters roadway R2. In this case, vehicle 10 initiates a left turn when the traffic signal 34 displays a signal allowing it to proceed. At this time, the signals displayed by the traffic signals 21V and 24V are permission signals. In this case, if there is a pedestrian crossing the roadway R2, the vehicle 10 in the process of turning left waits for the pedestrian crossing the roadway R2 to complete crossing.

When the signal displayed by the traffic signals 21V and 24V changes from an permission signal to an non-permission signal, there are no pedestrians crossing the roadway R2. At this point, the traffic signal 34 displays the signal to allow progress. Thus, when vehicle 10 turns left on roadway R1, vehicle 10 can turn left on roadway R1 by having the traffic signal 34 display a signal allowing vehicle 10 to proceed. Then, after the signals displayed by the traffic signals 21V and 24V change from a permission signal to a non-permission signal, the signal displayed by the traffic signal 34 changes from a signal to permit to proceed, to a signal to disallowed to proceed for the vehicle 10.

Assume that vehicle 10 turns right on roadway R1 at an intersection and enters roadway R2. In this case, similar to the sequence of signal changes for the traffic signals 21V, 24V, and 34 described above, the signal displayed by the traffic signals 22V and 23V changes from the permission signal, and then the signal displayed by the traffic signal 34 changes from a signal to permit to proceed for the vehicle 10.

Assume also that the signal displayed by the traffic signal 34 changes from a signal that permits the vehicle 10 to proceed. At this time, the driver of vehicle 10 may be attempting to go straight through the intersection, turn right or turn left. In this case, the driver of vehicle 10 may not anticipate that the signal displayed by the traffic signal 34 will change from a signal that permits progress. This may cause the driver of vehicle 10 to drive unsafely, such as braking suddenly, when the signal displayed by the traffic signal 34 changes.

(In-Vehicle Equipment)

The in-vehicle device 100 is a device installed in the vehicle 10. The in-vehicle device 100 takes images of the front of the vehicle 10. The in-vehicle device 100 predicts that the display of vehicle traffic signals at intersections will change based on the moving images taken in front of the vehicle 10. The in-vehicle device 100 predicts the change in the signal displayed by the traffic signal 34 using the fact that there is a time between the signal displayed by the traffic signal 21V or the signal displayed by the traffic signal 22V changing from a permission signal and the signal displayed by the traffic signal 34 changing from a signal to permit to proceed for the vehicle 10. The details of how the in-vehicle device 100 predicts that the signal displayed by the traffic signal 34 will change based on the moving image taken in front of the vehicle 10 are described below.

The in-vehicle device 100 comprises a computer having a processor 110, main memory 120, auxiliary memory 130, communication interface (communication I/F) 140, camera 150, and display 160. Processor 110 is, for example, a CPU (Central Processing Unit) or DSP (Digital Signal Processor). The main memory 120 is, for example, RAM (Random Access Memory). The auxiliary memory 130 is, for example, ROM (Read Only Memory). The auxiliary memory 130 is, for example, a hard disk drive (HDD) or a disk storage medium such as a CD-ROM, DVD disk, or Blu-ray disk. The auxiliary memory 130 may be removable media (portable storage media). Here, USB memory sticks or SD cards are examples of removable media. The communication I/F 140 is, for example, a LAN (Local Area Network) interface board. The camera 150 is a camera that is designed to capture images of the front of the vehicle 10. The display 160 is, for example, a liquid crystal display.

In the in-vehicle device 100, the auxiliary memory 130 stores an operating system (OS), various programs, and various information tables. In the in-vehicle device 100, the processor 110 can load the program stored in the auxiliary memory 130 into the main memory 120 and execute it to realize various functions as described below. However, some or all of the functions in the in-vehicle device 100 may be realized by hardware circuits such as ASICs or FPGAs. Note that the in-vehicle device 100 does not necessarily need to be realized by a single physical configuration, but may be configured by a plurality of computers that cooperate with each other.

(Functional Configuration)

Figure 3:
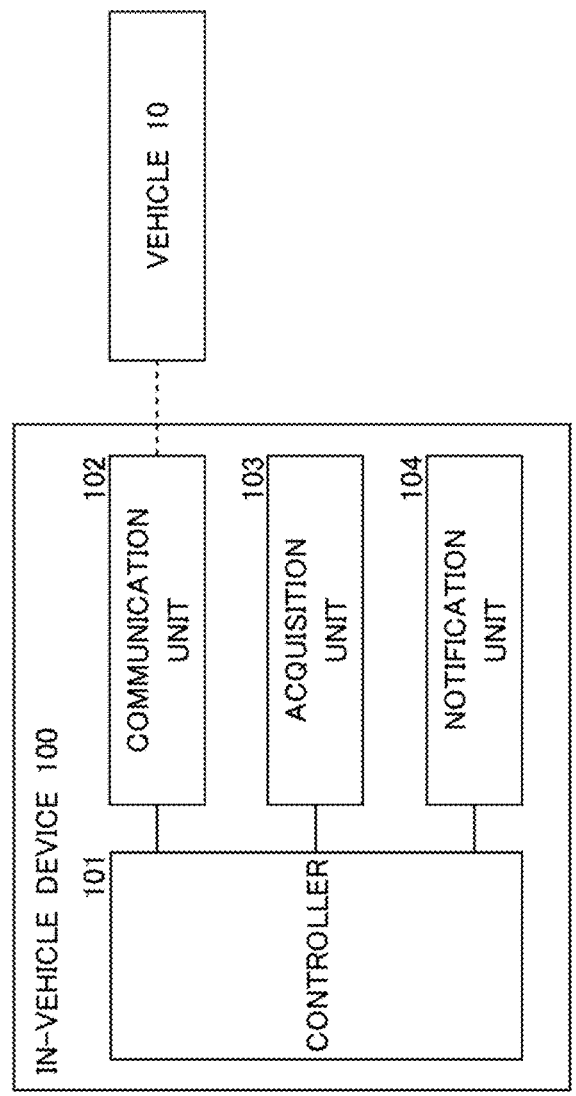
FIG. 3 is a block diagram indicating an example of the functional configuration of an in-vehicle device.

Next, the functional configuration of the in-vehicle device 100, which constitutes the vehicle system 1, is described based on FIG. 3. The functional configuration of the in-vehicle device 100 will be explained based on the example shown in FIG. 2. FIG. 3 is a block diagram indicating an example of the functional configuration of the in-vehicle device 100. The in-vehicle device 100 comprises a controller 101, a communication unit 102, an acquisition unit 103, and a notification unit 104.

The controller 101 has the function of performing arithmetic operations to control the in-vehicle device 100. The controller 101 can be realized by the processor 110 in the in-vehicle device 100. The communication unit 102 has the function of connecting the in-vehicle device 100 to the in-vehicle network. The communication unit 102 can be realized by the communication I/F 140 in the in-vehicle device 100.

The acquisition unit 103 has the function of acquiring video images captured by the camera 150. The video image acquired by the acquisition unit 103 includes a view of the front of the vehicle 10. The video image acquired by the acquisition unit 103 may include images of signals displayed by pedestrian signal at intersections that exist in front of the vehicle 10. The acquisition unit 103 transmits the acquired video image to the controller 101.

In the example shown in FIG. 2, vehicle 10 is moving from south to north on roadway R1, as described above. As noted above, of the eight pedestrian signals, Signal 21V and Signal 22V display their signals facing south. Therefore, the camera 150 can image signals with signals 21V and 22V, which display signals facing south. Therefore, the video image at the intersection that is acquired by the acquisition unit 103 includes the display of signals from the traffic signals 21V and 22V.

As noted above, after the signal displayed by the traffic signal 21V or the traffic signal 22V changes from a permitted signal, the signal displayed by the traffic signal 34 changes from a signal that permits the vehicle 10 to proceed. Therefore, controller 101 can predict that the signal displayed by the traffic signal 34 will change from a signal allowing the vehicle 10 to proceed when the signal displayed by the traffic signal 21V or the traffic signal 22V changes from a permitted signal. Therefore, the controller 101 determines whether the signal displayed by the traffic signal 21V or the traffic signal 22V has changed from the permitted signal or not based on the moving image received from the acquisition unit 103. In this way, the controller 101 detects that the signal displayed by the traffic signal 21V or the traffic signal 22V has changed from a permitted signal.

Here, the controller 101 detects that the signal displayed by the traffic signal 21V or the traffic signal 22V has changed from a permitted signal to a disallowed signal. The controller 101 may also detect that the signal displayed by the traffic signal 21V or the traffic signal 22V has changed to a signal indicating that the display is to be changed from a permitted signal to a disallowed signal (such as a flashing permitted signal) before the display is changed from a permitted signal to a disallowed signal.

By detecting that the signal displayed by the traffic signal 21V or the traffic signal 22V has changed from a permitted signal, controller 101 can predict that the signal displayed by the traffic signal 34 will change from a signal that permits the vehicle 10 to proceed to a signal that does not permit. Therefore, the controller 101 outputs the notification information. The notification information is information to inform the driver of vehicle 10 that the signal displayed by the traffic signal 34 at the intersection is expected to change to a signal that will not allow the vehicle to proceed. The controller 101 sends the output notification information to the notification unit 104.

Here, the controller 101 may not output notification information. Control 101 determines whether or not to output notification information based on the speed of vehicle 10 and the distance between vehicle 10 and the intersection when it detects that the signal displayed by the traffic signal 21V or the traffic signal 22V has changed from the authorized signal. Here, the distance between the vehicle 10 and the intersection is, for example, the distance from the vehicle 10 to the stop line.

Assume that the braking distance of vehicle 10 is longer than the distance from vehicle 10 to the intersection (stop line) at the timing when the in-vehicle device 100 outputs the notification information. Then, it is assumed that even if the driver of vehicle 10 decelerates the speed of vehicle 10 after the notification information is displayed by the notification unit 104, the driver may not be able to bring the vehicle 10 to a stop before the stop line.

Therefore, the controller 101 calculates the braking distance from the speed of the vehicle 10, and if the distance between the vehicle 10 and the intersection minus the braking distance is less than a predetermined value, the notification information is not output. In this way, the controller 101 determines whether it is possible to notify the driver of the vehicle 10 of the notification information. The controller 101 outputs the notification information when it determines that it is possible to notify the driver of the vehicle 10. This allows the controller 101 to output notification information in a safe situation, even if the driver of vehicle 10 steps on the brake.

The controller 101 determines when the notification unit 104 will notify the driver of the vehicle 10 of the notification information based on the speed of the vehicle 10 and the distance between the vehicle 10 and the intersection. The faster the speed of the vehicle 10, the earlier the controller 101 causes the notification information to be notified to the notification unit 104. The shorter the distance between the vehicle 10 and the intersection, the earlier the controller 101 will have the notification information notified to the notification unit 104. The controller 101 outputs the notification information including information specifying the timing to have the notification unit 104 notify the notification information. This allows the driver of vehicle 10 to decelerate vehicle 10 at a suitable time.

When the controller 101 detects that the signal displayed by the traffic signal 21V or the traffic signal 22V has changed from the permitted signal, it executes a process to slow down the speed of vehicle 10. The controller 101 transmits command information to the vehicle 10 via the communication unit 102, commanding the vehicle 10 to slow down the speed of the vehicle 10. Specifically, the controller 101 sends command information to the electronic control unit (ECU) that controls the driving of the vehicle 10. This allows the vehicle 10 to slow down. The command information may include information specifying the speed at which the vehicle 10 will travel after deceleration. The speed at which the vehicle 10 travels after deceleration is set, for example, to a speed at which it is safe to enter an intersection.

The command information may also include information specifying the timing of deceleration of the vehicle 10 and the acceleration at the time of deceleration. The controller 101 determines the timing of deceleration of the vehicle 10 and the acceleration at deceleration based on the speed of the vehicle 10 and the distance between the vehicle 10 and the intersection when the signal displayed by the traffic signal 21V or the traffic signal 22V is detected to have changed from an authorized signal. Specifically, based on the speed of vehicle 10 and the distance between vehicle 10 and the intersection, controller 101 determines the timing of vehicle 10 deceleration and the acceleration during deceleration so that the vehicle 10 reaches a speed at which it can safely stop at the stop line of the intersection.

The command information may also be information to temporarily deactivate cruise control when the vehicle 10 is traveling on cruise control. The command information may also be information to reduce the set speed when traveling in cruise control if the vehicle 10 is traveling in cruise control. Even if the command information is such information, the vehicle 10 can be decelerated.

Here, the controller 101 may detect that the signals displayed by the traffic signals 21V and 22V have changed from the permitted signals, but may not take any action to slow down the speed of the vehicle 10. For example, if the vehicle 10 slows down when there is a following vehicle behind the vehicle 10, the distance between the vehicle 10 and the following vehicle may become an unsafe distance. Therefore, the controller 101 determines whether there is a following vehicle behind the vehicle 10 and whether the distance between the vehicle 10 and the following vehicle is less than a predetermined distance. Here, the predetermined distance is set as the distance that allows a safe distance between the vehicle 10 and the following vehicle, even if the vehicle 10 slows down.

The controller 101 obtains sensor information from a camera located behind the vehicle 10 or a sensor sensing the rear of the vehicle 10. The controller 101 uses the sensor information to determine whether there is a following vehicle behind the vehicle 10 and whether the distance between the vehicle 10 and the following vehicle is less than a predetermined distance. In this way, the controller 101 determines whether it is possible to decelerate the vehicle 10. The controller 101 then outputs a control signal when it determines that it is possible to decelerate the vehicle 10. This allows the in-vehicle device 100 to safely decelerate the vehicle 10.

The notification unit 104 has the function of displaying various information to the driver of the vehicle 10. The notification unit 104 can be realized by the display 160 in the in-vehicle device 100. The notification unit 104 notifies the user by displaying the notification information received from the controller 101. The notification unit 104 may also provide notification information by voice. The driver of vehicle 10 can know that the signal displayed by the traffic signal 34 changes from a signal that permits progress to a signal that does not permit progress by means of the notification information provided by notification unit 104.

(Flowchart)

Figure 4:
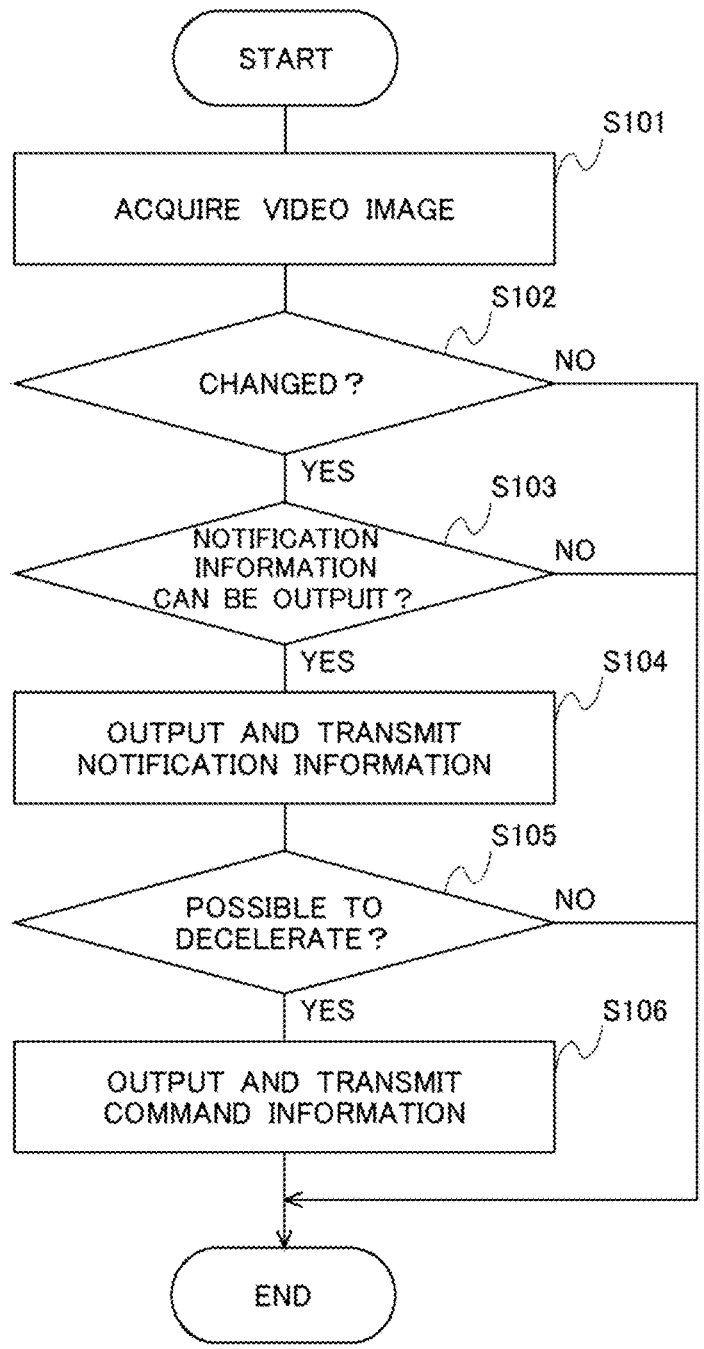
FIG. 4 is a flowchart of the process executed by the controller.

Next, the processes executed by the controller 101 in the in-vehicle device 100 in the vehicle system 1 are described based on FIG. 4. FIG. 4 is a flowchart of the process executed by the controller 101. The process in question is to output notification information and execute a process to slow down the vehicle 10 when the signal displayed by the traffic signals 21V and 22V changes from the authorized signal at an intersection. The process indicated in FIG. 4 is repeated at predetermined intervals. The process indicated in FIG. 4 is also based on the example indicated in FIG. 2.

In the process indicated in FIG. 4, the video image is first acquired from the acquisition unit 103 in S101. Next, in the process of S102, based on the moving image, a determination is made as to whether the signal at the traffic signal 21V or the traffic signal 22V has changed from a permitted signal or not. If a negative decision is made in the process of S102, the signal displayed by the traffic signal 34 is expected to remain unchanged from the signal allowing the vehicle 10 to proceed. In such cases, the process is terminated.

If a positive decision is made in the S102 process, whether or not the notification information can be output is determined in the S103 process. In the process of S103, the controller 101 calculates the braking distance from the speed of the vehicle 10 and determines whether the distance between the vehicle 10 and the intersection minus the braking distance is less than a predetermined value. The controller 101 makes a negative judgment in the process of S103 when the distance between the vehicle 10 and the intersection minus the braking distance is less than a predetermined value. If the distance between the vehicle 10 and the intersection minus the braking distance is not less than a predetermined value, the controller 101 makes an affirmative decision in the process of S103.

If a negative decision is made in the processing of S103, the notification information is not output. In such cases, the process is terminated. If a positive decision is made in the S103 process, the notification information is output in the S104 process. In the process of S104, the notification information is transmitted to the notification unit 104.

In the process of S105, it is determined whether it is possible to decelerate the vehicle 10. In the process of S105, it is determined whether there is a following vehicle behind the vehicle 10 and whether the distance between the vehicle 10 and the following vehicle is less than a predetermined distance. The controller 101 makes a negative decision in the process of S105 when there is a following vehicle behind the vehicle 10 and the distance between the vehicle 10 and the following vehicle is less than the predetermined distance. The controller 101 makes an affirmative decision in the process of S105 when there is no following vehicle behind the vehicle 10 or when the distance between the vehicle 10 and the following vehicle is not less than a predetermined distance.

If a negative decision is made in the process of S105, it is not appropriate to decelerate the vehicle 10. The process is therefore terminated. If a positive decision is made in the process of S105, the controller 101 performs the process to decelerate the vehicle 10. Therefore, command information is output in the S106 process. In the process of S106, the command information is transmitted to the vehicle 10 via the communication unit 102. This allows the vehicle 10 to automatically decelerate. The process is then terminated.

In this embodiment, the controller 101 performs S103 and S105 in the process indicated in FIG. 4 However, the controller 101 does not necessarily have to perform the processes of S103 and/or S105. In other words, the controller 101 may execute the processes of S104 and S106 if it makes a positive decision in the process of S102.

As explained above, notification information is output by the vehicle system 1 when the signal displayed by the traffic signal 21V or the traffic signal 22V is detected to have changed from an permission signal. This allows the driver of vehicle 10 to know that the signal displayed by the traffic signal 34 is expected to change to a signal allowing the vehicle 10 to proceed. This prevents the driver of vehicle 10 from driving unsafely, such as braking suddenly, due to a change in the signal displayed by the traffic signal 34. As a result, safety can be improved when the vehicle 10 travels near intersections.

The control signal is output by the vehicle system 1 when it detects that the display of the traffic signal 21V or the traffic signal 22V has changed from the permission signal. This will cause the vehicle 10 to slow down when the signal displayed by the traffic signal 34 is expected to change to a signal that will not allow the vehicle 10 to proceed. In this way, the driver of vehicle 10 can be prevented from driving unsafely, such as braking suddenly near an intersection, due to a change in the signal displayed by the traffic signal 34. This improves safety when the vehicle 10 travels near intersections.

(Variant 1)

In this embodiment, the condition that the in-vehicle device 100 does not output notification information is exemplified by the condition that the distance between the vehicle 10 and the intersection minus the braking distance is less than a predetermined value. However, there may be other conditions under which notification information is not output. The condition for not outputting notification information may be, for example, that the vehicle 10 and speed is below a predetermined speed. Here, the predetermined speed is set as the speed at which the vehicle 10 can safely stop.

The condition under which the in-vehicle device 100 does not output notification information may be, for example, that the vehicle 10 is traveling on a congested road. In this case, the in-vehicle device 100 determines whether or not the vehicle 10 is traveling on a congested road by receiving information about the status of the traffic jam on the road on which the vehicle 10 is traveling from the car navigation system or other system installed in the vehicle 10. In such cases, it is assumed that the vehicle 10 is traveling at a speed at which it is possible to safely stop the vehicle 10.

The condition under which the in-vehicle device 100 does not output notification information may be, for example, that the vehicle 10 is about to turn right or left at an intersection. Here, the in-vehicle device 100 can know that the vehicle 10 is about to make a right or left turn at an intersection by obtaining information from the vehicle 10 on whether the turn signal is on or not. By obtaining information on whether the road on which the vehicle 10 is traveling is a dedicated right-turn or left-turn lane, the in-vehicle device 100 can determine that the vehicle 10 is about to make a right or left turn at an intersection. In such a case, it is assumed that the driver of vehicle 10 has slowed the vehicle 10 sufficiently to make a right or left turn. Therefore, it is assumed that the vehicle 10 is traveling at a speed at which it is possible to safely stop the vehicle 10.

In these cases, the driver of the vehicle 10 can safely stop the vehicle 10 even if the driver of the vehicle 10 performs an operation to stop the vehicle 10 due to the notification information. This can still improve safety when the vehicle 10 travels near intersections.

The in-vehicle device 100 may allow the driver of the vehicle 10 to set whether or not to output notification information when the vehicle 10 can be safely stopped even if the driver of the vehicle 10 performs an operation to stop the vehicle 10. This can suppress the output of notification information to drivers of vehicle 10 who do not need the output of notification information.

The condition under which the in-vehicle device 100 does not output notification information may be that there is a following vehicle behind the vehicle 10 and that the distance between the vehicle 10 and the following vehicle is less than a predetermined distance. In this way, even when the driver of vehicle 10 steps on the brake due to understanding the notification information, the distance between the vehicle and the following vehicle can be set to a safe distance. As a result, safety can be improved when the vehicle 10 travels near intersections.

(Variant 2)

In this embodiment, the conditions under which the in-vehicle device 100 outputs control information are exemplified as follows: there is no following vehicle behind the vehicle 10, or the distance between the vehicle 10 and the following vehicle is not less than a predetermined distance. However, there may be other conditions under which the in-vehicle device 100 outputs control information.

The condition for the in-vehicle device 100 to output control information may be, for example, the presence of a right-turning vehicle (or left-turning vehicle in the case of right-hand traffic) in the oncoming lane. In the example indicated in FIG. 2, assume that an oncoming vehicle traveling from north to south on roadway R1 (hereinafter referred to simply as "oncoming vehicle") The vehicle is traveling from east to west on roadway R2, making a right turn at an intersection. Also, assume that vehicle 10 is going straight through an intersection. In this case, the oncoming vehicle may pause near the center of the intersection until such time as it can turn right through the intersection. If the vehicle 10 enters the intersection before or after the timing when the signal displayed by the traffic signal 34 changes from a signal that permits progress, a contact accident may occur.

Therefore, the in-vehicle device 100 outputs command information when it detects that an oncoming vehicle is about to make a right turn. The in-vehicle device 100 acquires the display of the blinkers of the oncoming vehicle from the video image acquired by the acquisition unit 103. When the in-vehicle device 100 detects that the winker of the oncoming vehicle is indicating a right turn, it outputs the command information. This allows the vehicle 10 to travel at a safe speed at intersections. This can still improve safety when the vehicle 10 travels near intersections.

(Variant 3)

Assume that the pedestrian signals at the intersection in front of the vehicle 10 and the vehicle signals at the intersection are pedestrian-vehicle separated signals. In this case, the sequence of signal changes displayed by the pedestrian and vehicle signals differs from the sequence in the implementation. Therefore, after the permission signal displayed by the traffic signal 21V or the traffic signal 22V changes, it does not necessarily change from the signal displayed by the traffic signal 34, which allows the vehicle 10 to proceed. Therefore, in this case, even if the permission signal displayed by the traffic signal 21V or the traffic signal 22V changes, it may not be possible to predict that the traffic signal 34 will change from a signal allowing the vehicle 10 to proceed. Therefore, in-vehicle device 100 determines whether pedestrian signal and the traffic signal for vehicle at the intersection that exists in front of vehicle 10 is pedestrian-vehicle separated signals based on position information at vehicle 10. And in-vehicle device 100 does not perform indicate processing on FIG. 4 when pedestrian signal and the traffic signal for vehicle at the intersection that exists in front of vehicle 10 and the traffic light for at that intersection is pedestrian-vehicle separated signals. This prevents the notification of notification information and the slowing down of the vehicle 10 when the traffic signal 34 cannot be predicted to change from a signal allowing the vehicle 10 to proceed.

(Variant 4)

In this system, the in-vehicle device 100 both outputs and transmits notification information and outputs and transmits control information when it detects that the signal displayed by the traffic signal 21V or the traffic signal 22V has changed. However, the in-vehicle device 100 does not necessarily have to both output and transmit notification information and output and transmit control information when it detects that the signal displayed by the traffic signal 21V or the traffic signal 22V has changed. The in-vehicle device 100 may only output and transmit control information without outputting and transmitting notification information when it detects that the signal displayed by the traffic signal 21V or the traffic signal 22V has changed. The in-vehicle device 100 may only output and transmit notification information without outputting and transmitting control information when it detects that the signal displayed by the traffic signal 21V or the traffic signal 22V has changed. This can still improve safety when the vehicle 10 travels near intersections.

OTHER EMBODIMENTS

The embodiments described above are examples only, and the present disclosure may be modified and implemented as appropriate without departing from the gist thereof. The processes and means described in this disclosure may be freely combined as long as no technical contradictions arise.

The process described as being performed by one device may be shared and executed by multiple devices. Alternatively, the processes described as being performed by different devices may be performed by one device. In a computer system, it is possible to flexibly change what hardware configuration (server configuration) is used to realize each function.

This disclosure can also be realized by supplying a computer program implementing the functions described in the above embodiments to a computer, and having one or more processors of said computer read and execute the program. Such computer programs may be provided to a computer by a non-transitory computer-readable storage medium that can be connected to the computer's system bus, or may be provided to a computer over a network. Non-transient computer readable storage media, for example, any type of disk, such as magnetic disks (such as floppy (registered trademark) disks or hard disk drives (HDDs)), optical disks (such as CD-ROM, DVD disks, or Blu-ray disks), Any type of media suitable for storing electronic instructions, such as read-only memory (ROM), random access memory (RAM), EPROM, EEPROM, magnetic cards, flash memory, or optical cards.

What is claimed is:

1. An information processing apparatus, comprising a controller implemented by at least one processor and configured to:
   acquire, from an on-board camera configured to capture images in front of a vehicle, a moving image of an intersection which exists in front of the vehicle, and at which there are (i) a pedestrian signal for pedestrians crossing a roadway that intersects a roadway the vehicle is traveling on and (ii) a vehicle signal for the vehicle; and
   in response to the controller detecting, based on the moving image, that a signal displayed by the pedestrian signal has changed from a first signal that permits a pedestrian to proceed,
      output, on a display included in the vehicle, notification information to notify a driver of the vehicle that a signal displayed by the vehicle signal at the intersection is expected to change to a second signal that does not permit the vehicle to proceed, and
      command the vehicle to automatically decelerate.

2. The information processing apparatus according to claim 1, wherein
   the controller is further configured to, in response to detecting that the signal displayed by the pedestrian signal has changed from the first signal,
      determine, based on a speed of the vehicle and a distance from the vehicle to the intersection, whether or not to output the notification information.

3. The information processing apparatus according to claim 1, wherein
   the controller is configured to, in response to detecting that the signal displayed by the pedestrian signal has changed from the first signal,
      determine, based on a speed of the vehicle and a distance from the vehicle to the intersection, when to output the notification information to the driver of the vehicle.

4. An information processing apparatus, comprising a controller implemented by at least one processor and configured to:
   acquire, from an on-board camera configured to capture images in front of a vehicle, a moving image of an intersection which exists in front of the vehicle, and at which there are (i) a pedestrian signal for pedestrians crossing a roadway that intersects a roadway the vehicle is traveling on and (ii) a vehicle signal for the vehicle;
   obtain sensor information from at least one of a camera or a sensor sensing a rear of the vehicle;
   in response to the controller detecting, based on the moving image, that a signal displayed by the pedestrian signals has changed from a first signal that permits a pedestrian to proceed,
      determine, based on the sensor information, whether there is a following vehicle behind the vehicle and whether a distance between the vehicle and the following vehicle is less than a predetermined distance; and
   in response to determining that no following vehicle exists behind the vehicle or that the distance between the vehicle and the following vehicle is not less than the predetermined distance,
      command the vehicle to automatically decelerate.

5. The information processing apparatus according to claim 4, wherein
   the controller is further configured to, in response to detecting that the signal displayed by the pedestrian signal has changed from the first signal,
      output, on a display included in the vehicle, notification information to notify a driver of the vehicle that a signal displayed by the vehicle signal at the intersection is expected to change to a second signal that does not permit the vehicle to proceed.

6. The information processing apparatus according to claim 4, wherein
   the controller is further configured to, in response to detecting that the signal displayed by the pedestrian signal has changed from the first signal,
      calculate a braking distance of the vehicle based on a speed of the vehicle,
      in response to determining that a distance between the vehicle and the intersection minus the braking distance is not less than a predetermined value,
         output, on a display included in the vehicle, notification information to notify a driver of the vehicle that a signal displayed by the vehicle signal at the intersection is expected to change to a second signal that does not permit the vehicle to proceed, and
      in response to determining that the distance between the vehicle and the intersection minus the braking distance is less than the predetermined value,
         not output the notification information to the driver.

7. The information processing apparatus according to claim 6, wherein
   the controller is configured to, in response to detecting that the signal displayed by the pedestrian signal has changed from the first signal,
      command the vehicle to automatically decelerate, and
      specify a speed at which the vehicle will travel after deceleration.

8. The information processing apparatus according to claim 7, wherein
   the controller is configured to, based on the speed of the vehicle and the distance between the vehicle and the intersection,
      specify a timing of the deceleration of the vehicle and an acceleration during the deceleration, so that the vehicle reaches a speed at which the vehicle safely stops at a stop line of the intersection.

9. The information processing apparatus according to claim 8, wherein
   the controller is configured to, in response to detecting that the signal displayed by the pedestrian signal has changed from the first signal when the vehicle is traveling on cruise control,
      command the vehicle to automatically decelerate by deactivating the cruise control or reducing a set speed of the cruise control.

10. A vehicle, comprising:
    an electronic control unit (ECU) configured to control driving of the vehicle;

an on-board camera configured to capture images in front of the vehicle;

at least one of a camera or a sensor configured to sense a rear of the vehicle;

a display in the vehicle; and a controller implemented by at least one processor and configured to:

acquire, from the on-board camera, a moving image of an intersection which exists in front of the vehicle, and at which there are (i) a pedestrian signal for pedestrians crossing a roadway that intersects a roadway the vehicle is traveling on and (ii) a vehicle signal for the vehicle;

obtain sensor information from the at least one of the camera or the sensor sensing the rear of the vehicle;

in response to the controller detecting, based on the moving image, that a signal displayed by the pedestrian signals has changed from a first signal that permits a pedestrian to proceed, determine, based on the sensor information, whether there is a following vehicle behind the vehicle and whether a distance between the vehicle and the following vehicle is less than a predetermined distance; and in response to determining that no following vehicle exists behind the vehicle or that the distance between the vehicle and the following vehicle is not less than the predetermined distance, command, through the ECU, the vehicle to automatically decelerate.

11. The vehicle according to claim 10, wherein the controller is further configured to, in response to detecting that the signal displayed by the pedestrian signal has changed from the first signal, output, on the display included in the vehicle, notification information to notify a driver of the vehicle that a signal displayed by the vehicle signal at the intersection is expected to change to a second signal that does not permit the vehicle to proceed.

12. The vehicle according to claim 10, wherein the controller is further configured to, in response to detecting that the signal displayed by the pedestrian signal has changed from the first signal, calculate a braking distance of the vehicle based on a speed of the vehicle, in response to determining that a distance between the vehicle and the intersection minus the braking distance is not less than a predetermined value, output, on the display included in the vehicle, notification information to notify a driver of the vehicle that a signal displayed by the vehicle signal at the intersection is expected to change to a second signal that does not permit the vehicle to proceed, and in response to determining that the distance between the vehicle and the intersection minus the braking distance is less than the predetermined value, not output the notification information to the driver.

13. The vehicle according to claim 12, wherein the controller is configured to, in response to detecting that the signal displayed by the pedestrian signal has changed from the first signal, command the vehicle to automatically decelerate, and specify a speed at which the vehicle will travel after deceleration.

14. The vehicle according to claim 13, wherein the controller is configured to, based on the speed of the vehicle and the distance between the vehicle and the intersection, specify a timing of the deceleration of the vehicle and an acceleration during the deceleration, so that the vehicle reaches a speed at which the vehicle safely stops at a stop line of the intersection.

15. The vehicle according to claim 14, wherein the controller is configured to, in response to detecting that the signal displayed by the pedestrian signal has changed from the first signal when the vehicle is traveling on cruise control, command the vehicle to automatically decelerate by deactivating the cruise control or reducing a set speed of the cruise control.

* * * * *